US010059296B2

(12) United States Patent
Farooq et al.

(10) Patent No.: US 10,059,296 B2
(45) Date of Patent: Aug. 28, 2018

(54) VEHICLE TABLE WITH DEPLOYABLE AIRBAG

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 234 days.

(21) Appl. No.: 15/068,681

(22) Filed: Mar. 14, 2016

(65) Prior Publication Data

US 2017/0259772 A1 Sep. 14, 2017

(51) Int. Cl.
| | |
|---|---|
| *B60R 21/2165* | (2011.01) |
| *B60N 3/00* | (2006.01) |
| *B60R 21/0136* | (2006.01) |
| *B60R 21/2338* | (2011.01) |
| *B60R 21/26* | (2011.01) |
| *B60R 21/20* | (2011.01) |
| *B60R 21/231* | (2011.01) |

(52) U.S. Cl.
CPC ......... *B60R 21/2165* (2013.01); *B60N 3/001* (2013.01); *B60R 21/0136* (2013.01); *B60R 21/20* (2013.01); *B60R 21/2338* (2013.01); *B60R 21/26* (2013.01); *B60R 21/231* (2013.01)

(58) Field of Classification Search
CPC .................................................. B60R 21/203

USPC ......................................................... 280/731
See application file for complete search history.

(56) References Cited

U.S. PATENT DOCUMENTS

| | | | | |
|---|---|---|---|---|
| 5,172,790 | A * | 12/1992 | Ishikawa | B60R 21/20 180/268 |
| 6,966,576 | B1 * | 11/2005 | Greenstein | B60R 21/23138 280/730.1 |
| 7,594,675 | B2 * | 9/2009 | Bostrom | B60R 21/207 280/728.2 |
| 8,210,566 | B2 * | 7/2012 | Fukawatase | B60R 21/231 280/728.3 |
| 8,353,529 | B2 * | 1/2013 | Tomitaka | B60R 21/231 280/730.1 |
| 8,382,181 | B2 | 2/2013 | Bourgraf et al. | |
| 9,096,150 | B2 | 8/2015 | Cuddihy et al. | |
| 2010/0295280 | A1 * | 11/2010 | Tomitaka | B60R 21/23138 280/730.1 |
| 2013/0093171 | A1 * | 4/2013 | Eckert | B60R 21/203 280/743.2 |

(Continued)

FOREIGN PATENT DOCUMENTS

| | | | | |
|---|---|---|---|---|
| EP | 1405758 A2 * | 4/2004 | ............ | B60N 3/001 |
| FR | 2724350 A1 | 3/1996 | | |

(Continued)

*Primary Examiner* — Karen Beck
(74) *Attorney, Agent, or Firm* — Frank A. MacKenzie; Bejin Bieneman PLC

(57) ABSTRACT

A vehicle interior includes an interior compartment and a table in the interior compartment. The table has a top surface including a perimeter. An airbag extends around the perimeter of the top surface of the table. The airbag is inflatable in response to a vehicle impact to limit the likelihood of an occupant impacting the table and/or to absorb energy from the occupant during the vehicle impact.

22 Claims, 9 Drawing Sheets

(56) References Cited

U.S. PATENT DOCUMENTS

2015/0137564 A1   5/2015   Cuddihy et al.

FOREIGN PATENT DOCUMENTS

FR         2910402 A1 *  6/2008  ............. B60N 3/001
JP       2009208566 A     9/2009

* cited by examiner

VEHICLE TABLE WITH DEPLOYABLE AIRBAG

BACKGROUND

Vehicles may include amenities that allow occupants to face each other during operation of the vehicle. As one example, an autonomous vehicle may be autonomously operated, allowing the occupants of the vehicle to ride in the vehicle without monitoring the operation of the vehicle. Specifically, the autonomous vehicle may include seats free to rotate during operation of the vehicle. This may allow the occupants of the seats to face each other and to interact. This may also allow all of the occupants to relax, interact with one another, and focus on vehicle amenities. There remains an opportunity to design vehicle amenities for the occupants that takes into account the reduced operation monitoring provided by the autonomous vehicle.

DETAILED DESCRIPTION

Figure 1:
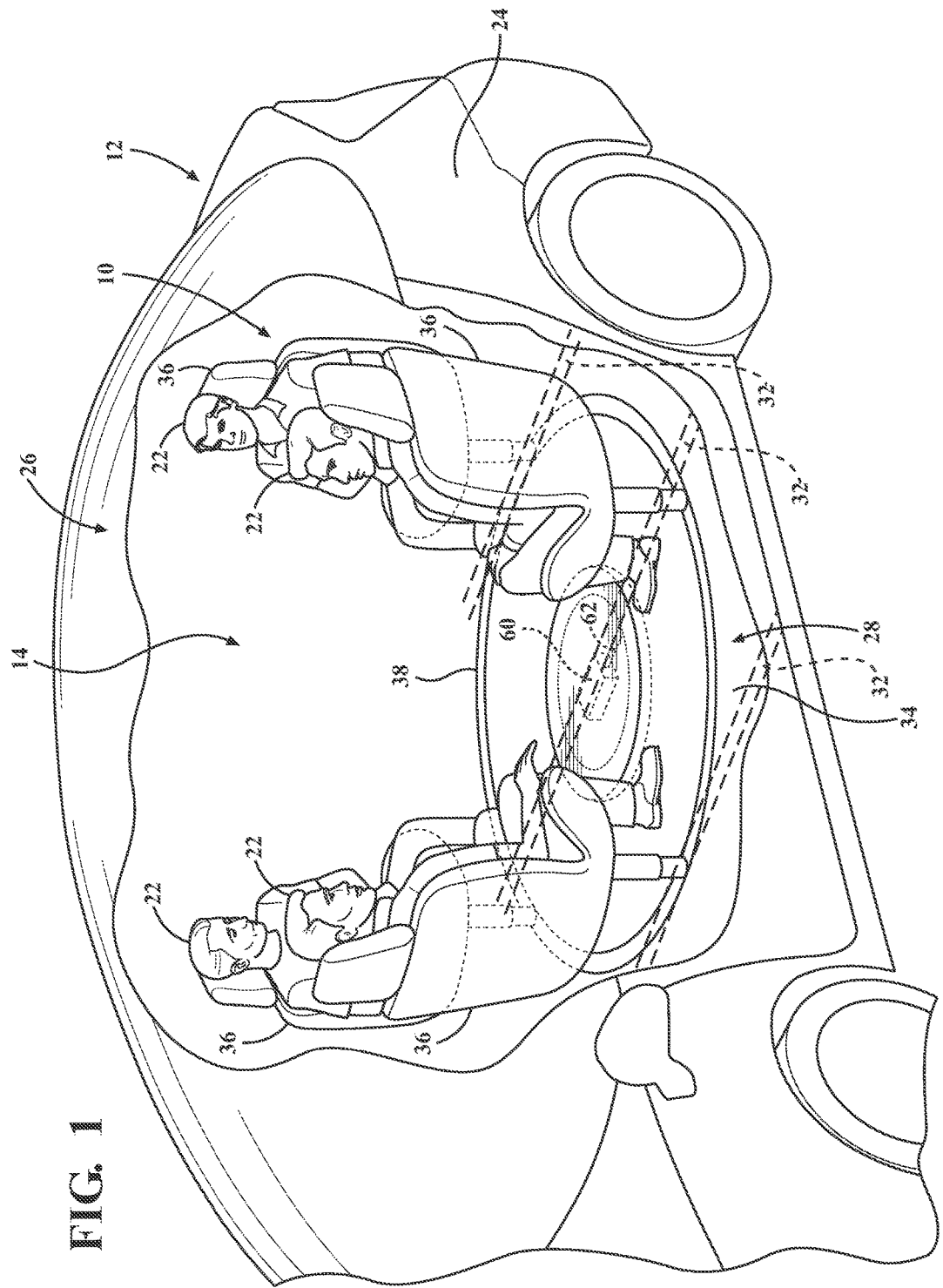
FIG. 1 is a perspective view of a vehicle including a retractable table in a retracted position, an airbag in an uninflated position, and an inflator supported by the retractable table.

With reference to the Figures, wherein like numerals indicate like parts throughout the several views, a vehicle interior 10 of a vehicle 12 includes an interior compartment 14 and a table 16 in the interior compartment 14. The table 16 has a top surface 18 including a perimeter. An airbag 20 extends around the perimeter of the top surface 18 of the table 16.

As set forth further below, the airbag 20 may inflate to an inflated position, e.g. in response to a vehicle impact, shown in FIG. 3. The airbag 20 in the inflated position may absorb energy during the vehicle impact from an occupant 22 seated adjacent the table 16, and thereby the airbag 20 in the inflated position may reduce the likelihood of the occupant 22 impacting the table 16 during the vehicle impact.

The vehicle 12 may be an autonomous vehicle. In other words, the vehicle 12 may be autonomously operated such that the vehicle 12 may be driven without constant attention from a driver, i.e., the vehicle 12 may be self-driving without human input.

As shown in FIGS. 1-6, the vehicle 12 includes a vehicle body 24 defining the vehicle interior 10. The vehicle body 24 may include a roof 26, a floor 28, and a plurality of pillars (not numbered). The vehicle body 24 may have a uni-body construction, a body-on-frame construction, or any other suitable construction. The floor 28 may include cross-beams 32 and a floor panel 34 supported on the cross-beams 32. The floor 28 may include upholstery, e.g., carpeting, trim, etc., supported on the floor panel 34.

The vehicle 12 may include one or more seats 36. For example, as shown in the Figures, the vehicle 12 may include a plurality of seats 36 arranged around the table 16. The arrangement of the plurality of seats 36 may be in any other suitable form.

The seats 36 may be rotatable relative to the vehicle body 24 about an axis A substantially perpendicular to the floor 28, e.g. a vertical axis, as identified in FIG. 1.

The seats 36 may be rotatably mounted to the floor 28 at a fixed position. In other words, the seats 36 may be mounted to the floor 28 in the fixed position and, as set forth above, may be rotatable about the fixed position in a cross-vehicle direction and a vehicle fore-and-aft direction. Alternatively, the seats 36 may be movable relative to the floor 28. As one example, the floor 28 may include a ring 38 movably coupled to the floor panel 34. The ring 38 may support the seats 36 to allow the seats 36 to move relative to the floor panel 34. In other words, the seats 36 and the ring 38 may move together as a unit relative to the floor panel 34. The ring 38 may be concentric about the table 16 to rotate the seats 36 to various positions about the table 16. Alternatively, the seats 36 may be independently movable relative to the floor panel 34.

The table 16 may include a pedestal 40 and a top 42 supported on the pedestal 40. The pedestal 40 of the table 16 may include a base 44 spaced from the top 42 of the table 16. The base 44 of the pedestal 40 of the table 16 may be mounted to the floor 28. Alternatively, for example, the base 44 may be mounted to the roof 26, pillars, etc.

The top surface 18 of the table 16 may be on the top 42 of the table 16. The top surface 18 of the table 16 may be round, oval or any other suitable shape. The base 44 of the table 16 may be supported by the floor 28, by the roof 26, by the plurality of seats 36 or any other suitable mechanical structure. As set forth above, the airbag 20 extends around the perimeter of the top surface 18 of the table 16. For example, the airbag 20 may extend entirely around the perimeter of the top surface 18 of the table 16, as shown in FIG. 3. Alternatively, the airbag 20 may extend partially around the perimeter of the top surface 18 of the table 16, e.g., along one or more portions of the perimeter.

The table 16 may be retractable, e.g., relative to the floor 28, the roof 26, the pillars, or any other suitable component of the vehicle interior 10. In other words, the table 16 has an adjustable height from the base 44 to the top 42. For example, as shown in FIG. 1, the table 16 may be retractable relative to the floor 28. Specifically, the table 16 may be movable from a retracted position, as shown in FIGS. 1 and 4, to an extended position, as shown in FIGS. 2, 3, and 5-7. The table 16 may be moved between the retracted position to the extended position, e.g. by the occupant 22 of the vehicle 12, or may be automated, e.g., assisted by an electric or hydraulic actuator (not shown) in the table 16, floor 28, etc. The pedestal 40 of the table 16, for example, may be telescopic to allow the table 16 to move between the retracted position and the extended position.

The airbag 20 is a component of an airbag assembly 46. The airbag assembly 46 may include an airbag base 48 supporting the airbag 20. The airbag base 48 may, for example, include clips, panels, etc., for attaching to the airbag 20 and for attaching the airbag assembly 46 to the table 16.

Figure 3:
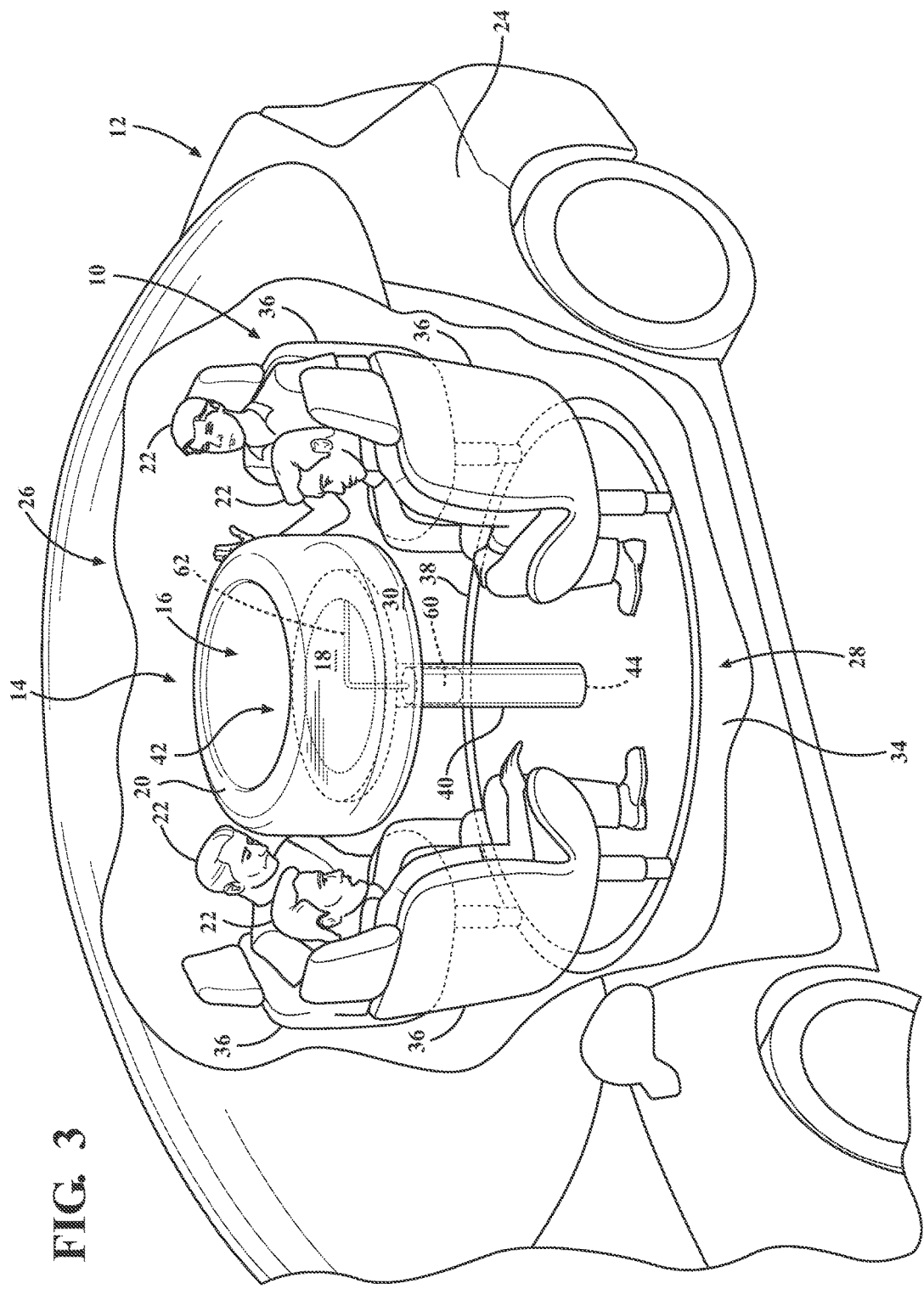
FIG. 3 is the perspective view of FIG. 1 including the table in the extended position and the airbag in an inflated position.
Figure 4:
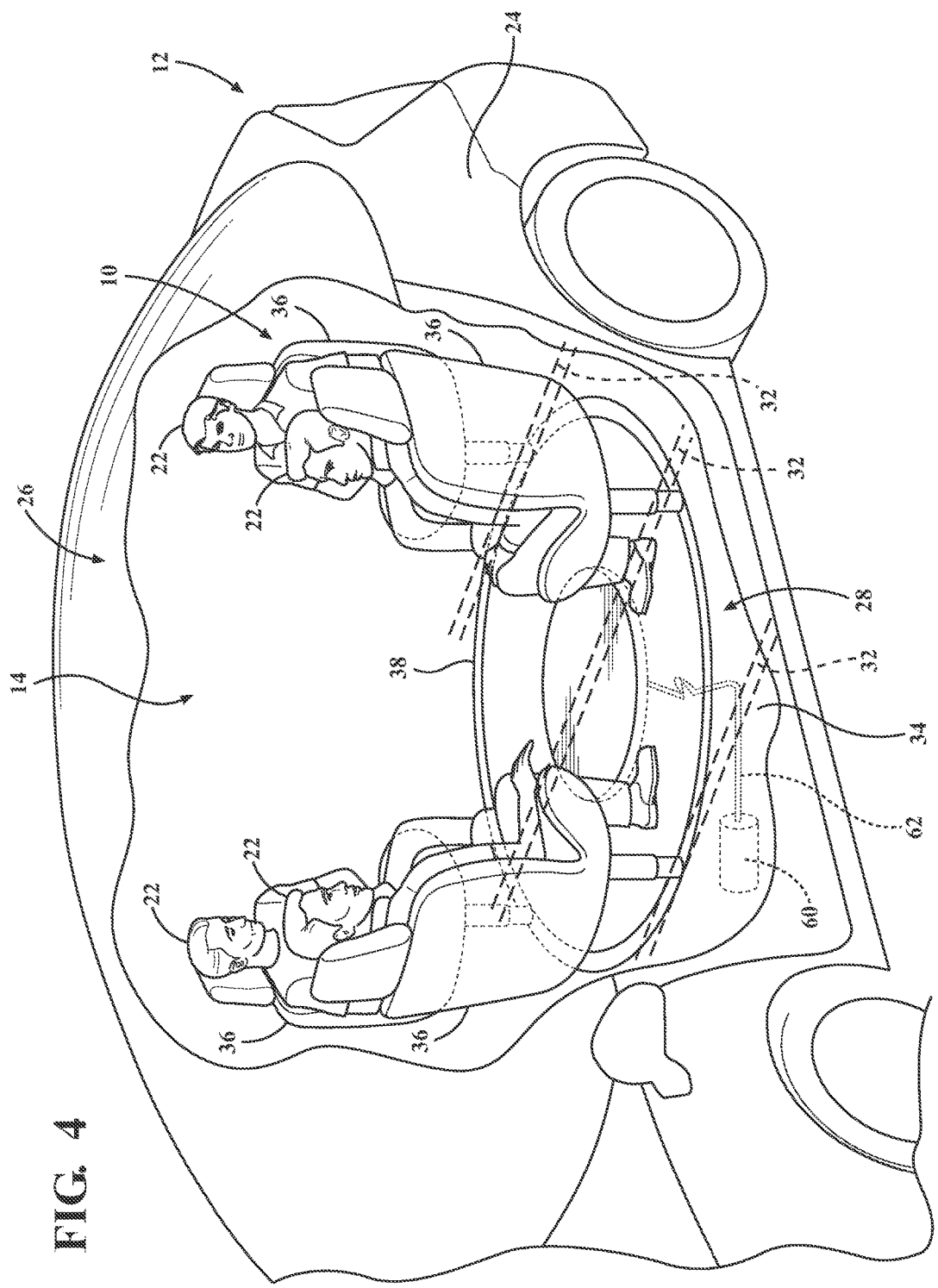
FIG. 4 is a perspective view of the vehicle including the retractable table in the retracted position, the airbag in the uninflated position, and the inflator fixed relative to a vehicle body.

As an example, the airbag 20 in the inflated position may have an annular shape, shown in FIG. 3, i.e., includes a central hole (not numbered). The annular shape is circular in cross-section, as shown in the Figures. Alternatively, the annular shape may have any suitable cross sectional shape, e.g., oval, rectangular, etc. For example, the cross-sectional shape of the annular shape may match the shape of the top surface 18 of the table 16.

The airbag 20 may be mounted to the top 42 of the table 16. For example, the top 42 of the table 16 includes a peripheral edge 50 (identified in FIG. 8), and the airbag 20 may be mounted to the peripheral edge 50. Specifically, the airbag base 48 of the airbag assembly 46 may be mounted to the top 42 of the table 16, e.g., the peripheral edge 50. The airbag 20 may, alternatively, be mounted to the pedestal 40 of the table 16.

The airbag 20 may be inflated radially from the uninflated position to the inflated position, as shown in FIG. 3. The airbag 20 may also be inflated transversely to the top surface 18 of the table 16, e.g., upwardly and downwardly from the peripheral edge 50.

The airbag 20 may be formed of any suitable type of material, e.g. from a woven polymer. For example, the airbag 20 may be formed of woven nylon yarn, e.g. nylon 6. Other suitable examples include polyether ether ketone (PEEK), polyetherketoneketone (PEKK), polyester, or any other suitable polymer. The woven polymer may include a coating such as silicone, neoprene, urethane, polyorgano siloxane, etc.

Figure 7:
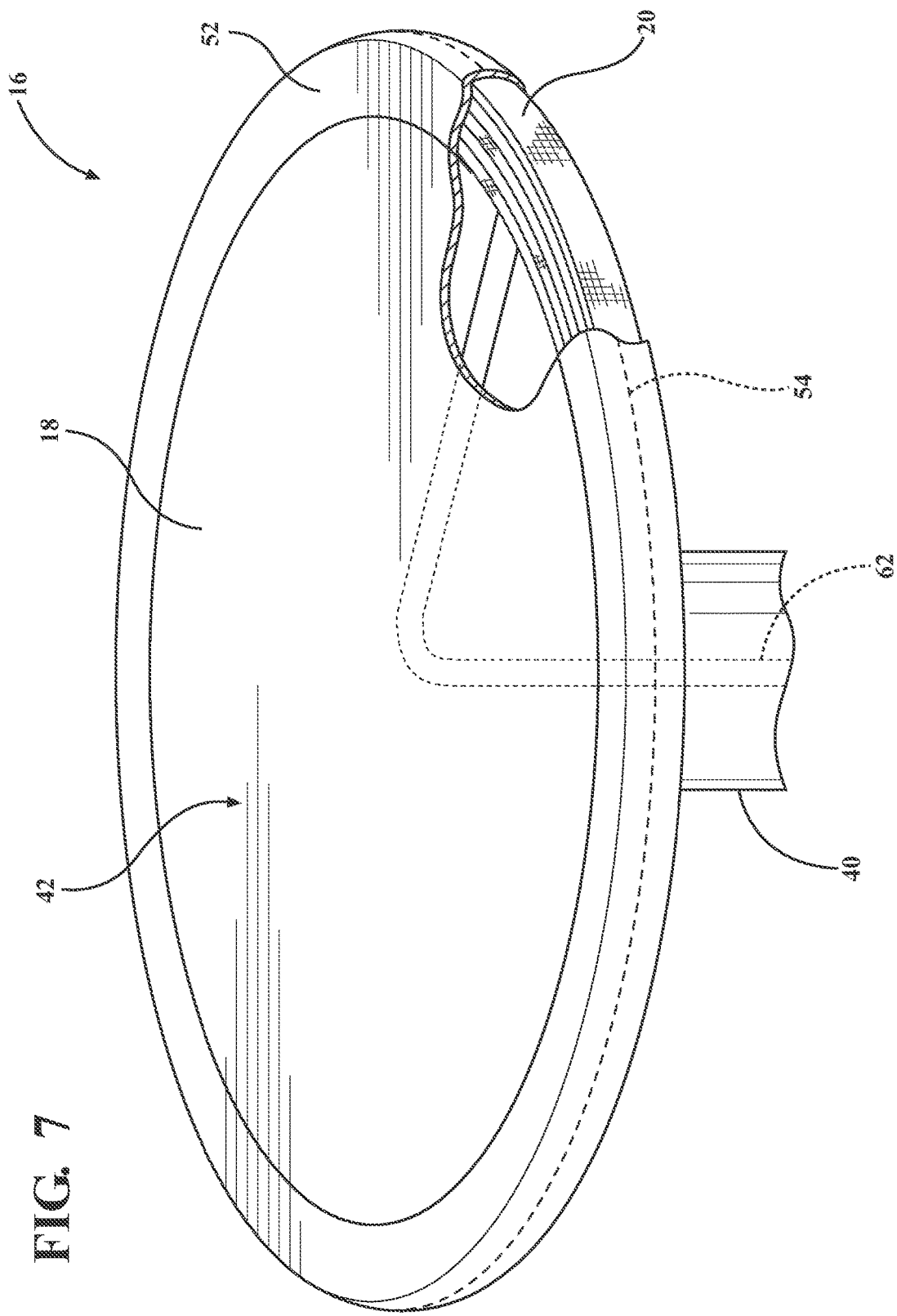
FIG. 7 is a perspective view of the table with the airbag in the uninflated position.
Figure 8:
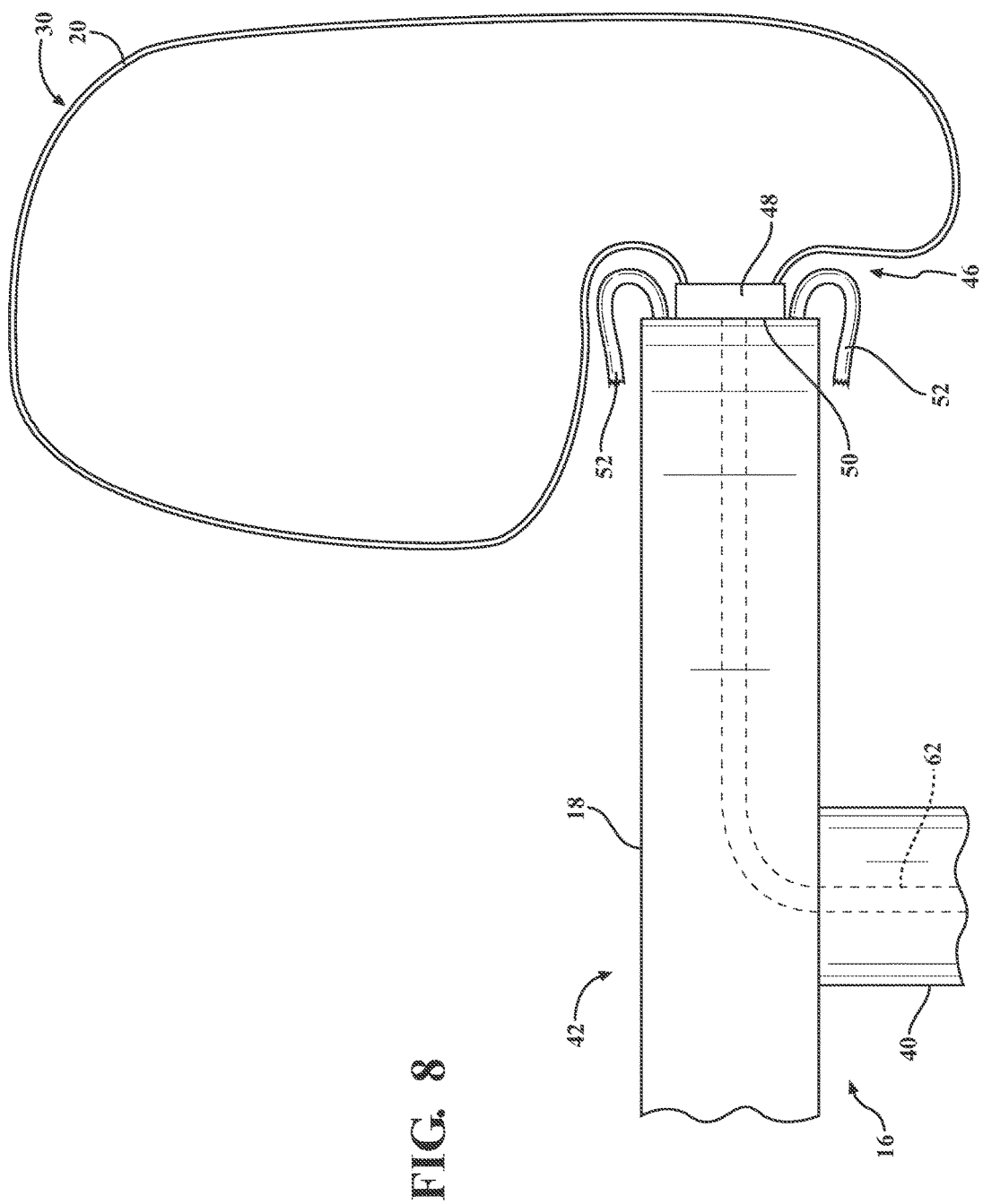
FIG. 8 is a cross-sectional view of the table with the airbag in the inflated position.

As shown in FIGS. 7-8, the vehicle interior 10 may include a cover 52 supported by the table 16 and the airbag 20 may be disposed between the table 16 and the cover 52. The cover 52 may, for example, cover 52 the peripheral edge 50 of the top 42 of the table 16. Upon inflation of the airbag 20, the airbag 20 may break the cover 52 and protrude outwardly from the cover 52 to the inflated position.

As shown in FIGS. 7-8, the cover 52 may include a tear seam 54. Upon inflation of the airbag 20, the airbag 20 may break the tear seam 54 and protrude through the tear seam 54 to the inflated position. As an alternative or in addition, the airbag 20 may be aligned along the tear seam 54 around the perimeter of the table 16 and placed on the tear seam 54.

Figure 6:
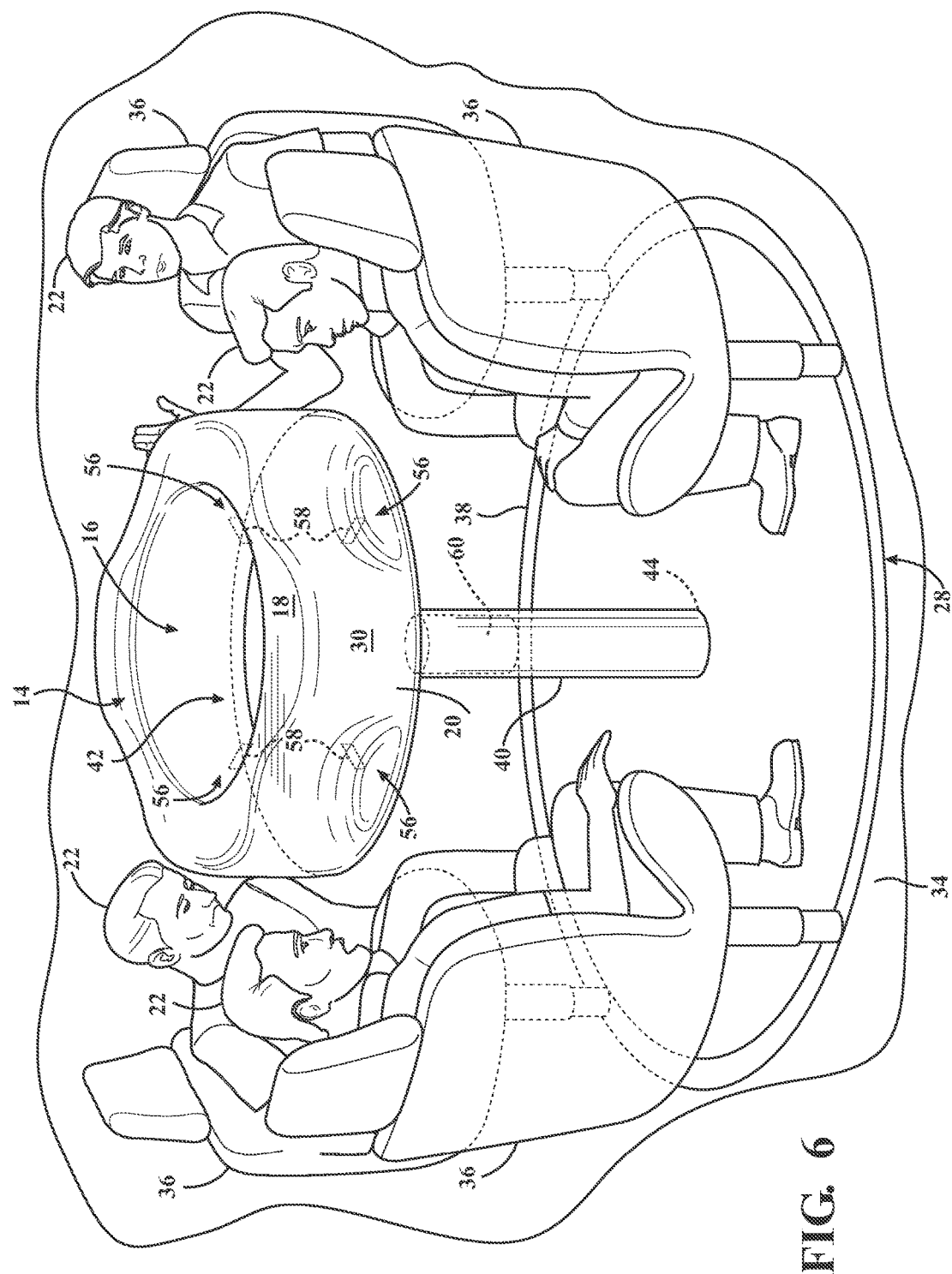
FIG. 6 is a perspective view of the vehicle including the table in the extended position and the airbag in an inflated position and having a plurality of indentations.

As shown in FIG. 6, the airbag 20 in the inflated position has an impact surface 30. The occupant 22 may contact the impact surface 30 when the airbag 20 is in the inflated position, e.g., during the vehicle impact.

With reference to FIG. 6, the impact surface 30 may include a plurality of indentations 56. The indentations 56 may be positioned to be adjacent to the seats 36, respectively. The indentations 56 may catch the heads of occupants 22 if the occupants 22 slide along the impact surface 30, and thus reduce the likelihood of the heads of the occupants 22 impacting each other during the vehicle impact.

The airbag assembly 46 may include a tether 58 restraining inflation of the airbag 20 to form the indentations 56. Specifically, the tether 58 may extend from the airbag base 48 to the indentation 56. The tether 58 may be engaged with the airbag 20 at the indentation 56 in the inflated position. For example, the tether 58 may be stitched to the airbag 20 at the indentation 56, as shown in FIG. 6. Alternatively, the indentations 56 may be constructed in various ways, e.g. stitching lines placed in the airbag 20, or by accordingly adjusting a size of an area of the airbag 20 where an indentation 56 is desired, or any other suitable way.

The vehicle interior 10 may include an inflator 60. The inflator 60 expands the airbag 20 with an inflation medium, such as a gas, to move the airbag 20 from the uninflated position to the inflated position. The inflator 60 may be, for example, a pyrotechnic inflator that uses a chemical reaction to drive the inflation medium into the airbag 20. Alternatively, the inflator 60 may be, for example, a cold-gas inflator that, when activated, ignites a pyrotechnic charge that creates an opening for releasing the pressurized inflation medium to the airbag 20 via a fill tube 62. Alternatively, the inflator 60 may be of any suitable type, for example, a hybrid inflator.

Figure 2:
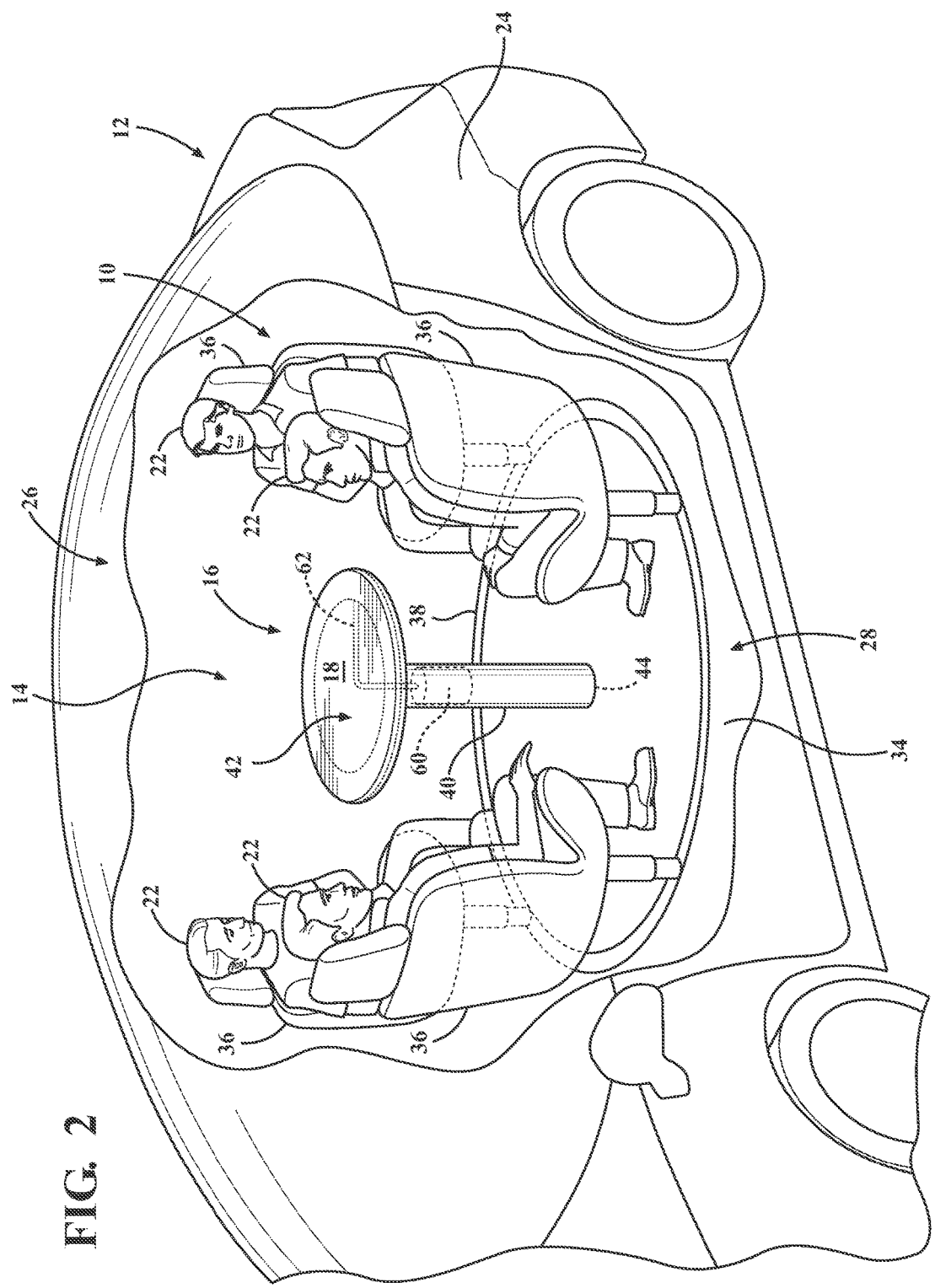
FIG. 2 is the perspective view of FIG. 1 including the retractable table in an extended position and the airbag in the uninflated position.

As shown in FIGS. 1-3, the inflator 60 may be supported by the table 16, for example, the inflator 60 may be disposed in the pedestal 40. Alternatively, for example, the inflator 60 may be supported by the top 42 of the table 16. When supported by the table 16, the inflator 60 moves with the table 16, and the airbag 20, as the table 16 moves between the retracted position and the extended position.

Figure 5:
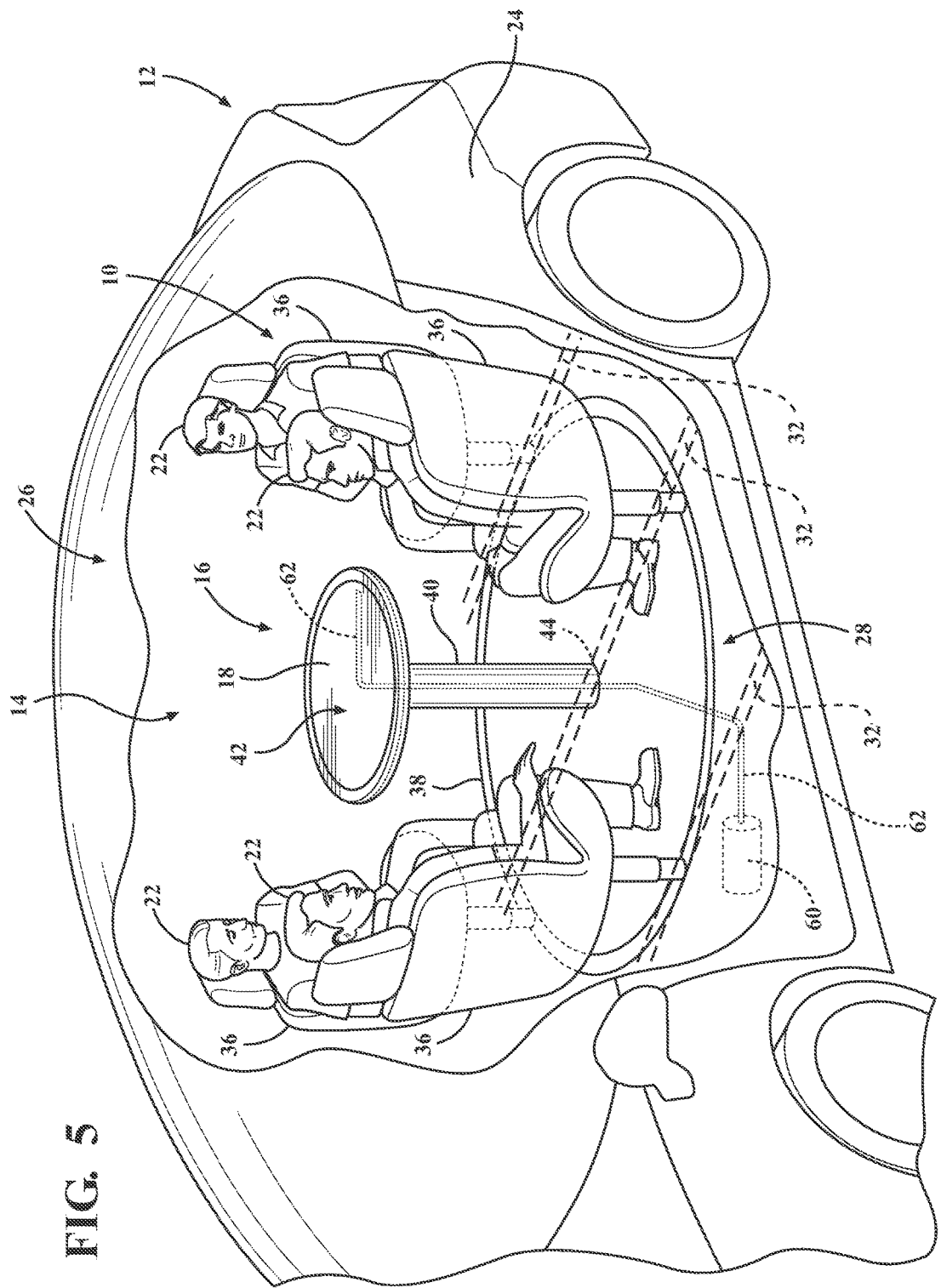
FIG. 5 is a perspective view of FIG. 3 including the retractable table in the extended position and the airbag in the uninflated position, and the inflator fixed relative to the vehicle body.

As another example, as shown in FIGS. 4-5, the inflator 60 may be fixed to the vehicle body 24, for example fixed to the cross beam as shown in FIGS. 4-5, the inflator 60 may be mounted under the floor 28. Alternatively, the inflator 60 may be mounted to any suitable position in the vehicle body 24, e.g. one of the plurality of pillars. A fill tube 62 may connect the inflator 60 to the airbag 20. When the table 16 is moved between the retracted position and the extended position, the fill tube 62 maintains fluid communication between the inflator 60 and the airbag 20. For example, the fill tube 62 may be rolled, kinked, etc., inside the pedestal 40 of the table 16 when the table 16 is in the retracted position. The fill tube 62 may be formed of any suitable material, e.g., a flexible material and/or a shape-memory material.

Figure 9:
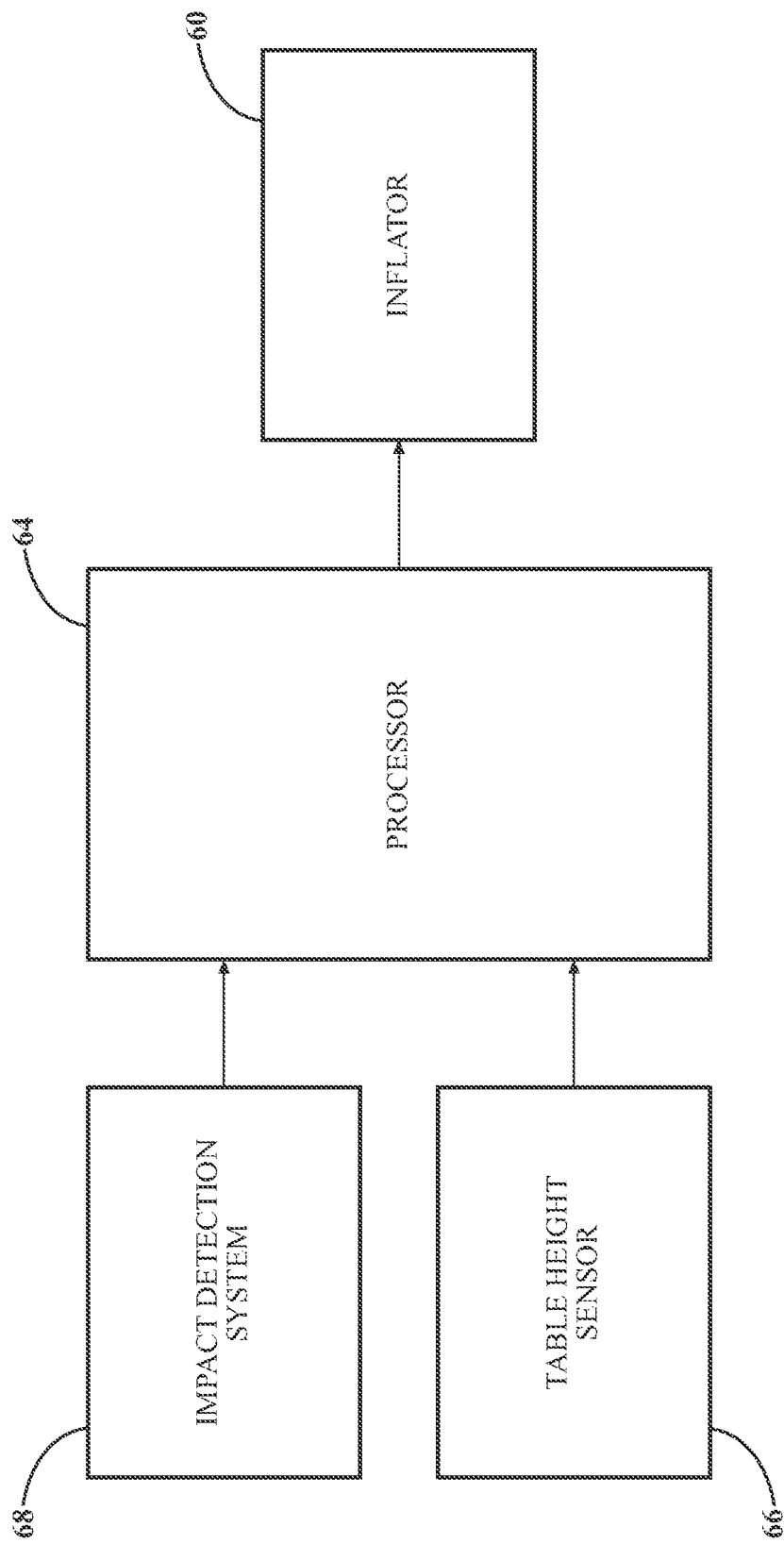
FIG. 9 is a flowchart including a processor, an impact detection system, a table height sensor, and the inflator.

With reference to FIG. 9, the vehicle 12 may include a processor 64 programmed to initiate an inflation of the airbag 20 based on the adjustable height of the table 16 in response to detection of the vehicle impact. The processor 64 may be embedded in a microcontroller. The microcontroller may include memory, etc. The memory of the microcontroller may store instructions executable by the processor 64 and the processor 64 may read the instructions from the memory and execute the instructions. In order to initiate the inflation of the airbag 20 the processor 64 communicates with the inflator 60, e.g. through a direct electrical wiring, wherein the processor 64 sends an analog or a digital signal to the inflator 60, or through a conventional vehicle communication network like CAN (Control Area Network), Ethernet, LIN (Local Interconnect Network) or any other way.

The vehicle interior 10 may include a table height sensor 66 to detect the adjustable height of the table 16. In other words, the table height sensor 66 may detect whether the table 16 is in the extended position or the retracted position. The processor 64 may use the information provided by the table height sensor 66, among other information, to determine whether the inflation shall be initiated. Specifically, the processor 64 may initiate inflation of the airbag 20 in response to the vehicle impact when the table height sensor 66 indicates to the processor 64 that the table 16 is in the extended position. Conversely, the processor 64 may refrain from initiating inflation of the airbag 20 when the vehicle impact is detected and the table height sensor 66 indicates to the processor 64 that the table 16 is in the retracted position.

The table height sensor 66 may be, for example, an ultra sound sensor measuring the distance using a so called time of travel concept, or a camera with image processing algorithms measuring the distance, or a mechanical sensor measuring the movement of the table 16 from a reference point. Other methods and technologies may also be used to measure the adjustable height of the table 16. The table height sensor 66 communicates with the processor 64, shown in FIG. 9. A communication between the table height sensor 66 and the processor 64 may be a direct wiring, wherein the table height sensor 66 sends an analog or digital signal to the processor 64, or using a conventional vehicle communication network like CAN (Control Area Network), Ethernet, LIN (Local Interconnect Network) or any other way.

If an impact detection system 68 detects the vehicle impact and the table 16 is in the extended position, the processor 64 may initiate inflation of the airbag 20. Specifically, the processor 64 may receive a signal from the impact detection system 68 indicating the vehicle impact. If the table height sensor 66 indicates to the processor 64 that the table 16 is in the retracted position, the processor 64 refrains from initiating inflation of the airbag 20 in response to the vehicle impact. If the table height sensor 66 indicates to the processor 64 that the table 16 is in the extended position, the processor 64 may initiate inflation of the airbag 20 in response to the vehicle impact. As the airbag 20 is inflated, the airbag 20 breaks the tear seam 54 and extends through the tear seam 54 to the inflated position. In the inflated position, the airbag 20 may be impacted by the occupants 22 of the vehicle and may limit or prevent impact between the occupants 22 and the top 42 of the table 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle interior comprising:
   an interior compartment;
   a table in the interior compartment, the table having a top including a peripheral edge; and
   an airbag extending around the peripheral edge of the top of the table, the airbag being inflatable to an inflated position and deploying radially from the peripheral edge to the inflated position.

2. The vehicle interior according to claim 1, further comprising a cover supported by the table, the airbag disposed between the table and the cover.

3. The vehicle interior according to claim 2, wherein the cover includes a tear seam.

4. The vehicle interior according to claim 3, wherein the airbag is aligned along the tear seam and positioned thereon.

5. The vehicle interior according to claim 1, wherein the airbag is inflatable radially from the table to an inflated position.

6. The vehicle interior according to claim 1, wherein the airbag is annular in the inflated position.

7. The vehicle interior according to claim 6, wherein the airbag extends entirely around the peripheral edge of the top of the table.

8. The vehicle interior according to claim 1, wherein the airbag has an impact surface including an indentation in the inflated position.

9. The vehicle interior according to claim 8, further comprising a tether engaged with the airbag at the indentation in the inflated position.

10. The vehicle interior according to claim 8, further comprising a seat positioned to be adjacent the indentation when the airbag is in the inflated position.

11. The vehicle interior according to claim 1, wherein the airbag has an impact surface including an indentation in the inflated position, and wherein the airbag is supported by an airbag base, and a tether extends from the airbag base to the indentation.

12. The vehicle interior according to claim 1, wherein the airbag has an impact surface including a plurality of indentations spaced about the top in the inflated position, and further comprising a plurality of seats positioned to be adjacent the plurality of indentations, respectively, when the airbag is in the inflated position.

13. The vehicle interior according to claim 1, further comprising an inflator supported by the table and in fluid communication with the airbag.

14. The vehicle interior according to claim 13, further comprising a vehicle body defining the interior compartment, wherein the table is retractable relative to the vehicle body.

15. The vehicle interior according to claim 1, further comprising a vehicle body defining the interior compartment and an inflator fixed relative to the vehicle body in fluid communication with the airbag, wherein the table is retractable relative to the vehicle body.

16. A vehicle interior comprising:
    a table including a base and a top spaced from the base; the table having an adjustable height from the base to the top;
    an airbag supported by the table; and
    a processor programmed to initiate an inflation of the airbag based on the adjustable height of the table in response to detection of a vehicle impact.

17. The vehicle interior according to claim 16, further comprising a table height sensor connected to the processor.

18. The vehicle interior according to claim 16, further comprising a vehicle body, wherein the table is retractable relative to the vehicle body.

19. The vehicle interior according to claim 16, further comprising an inflator supported by the table and in fluid communication with the airbag.

20. The vehicle interior according to claim 16, further comprising a vehicle body and an inflator fixed relative to the vehicle body in fluid communication with the airbag, wherein the table is retractable relative to the vehicle body.

21. A vehicle interior comprising:
    an interior compartment;
    a table in the interior compartment, the table having a top surface including a perimeter; and
    an airbag extending around the perimeter of the top surface of the table;
    wherein the airbag is inflatable to an inflated position, the airbag being annular in the inflated position.

22. A vehicle interior comprising:
    an interior compartment;
    a table in the interior compartment, the table having a top surface including a perimeter;
    an airbag extending around the perimeter of the top surface of the table; and an inflator in fluid communication with the airbag, wherein the table is retractable relative to the vehicle body.

\* \* \* \* \*